March 19, 1963  H. COLE ETAL  3,082,102
PROCESSES OF MANUFACTURING GLASS
Filed Sept. 3, 1958
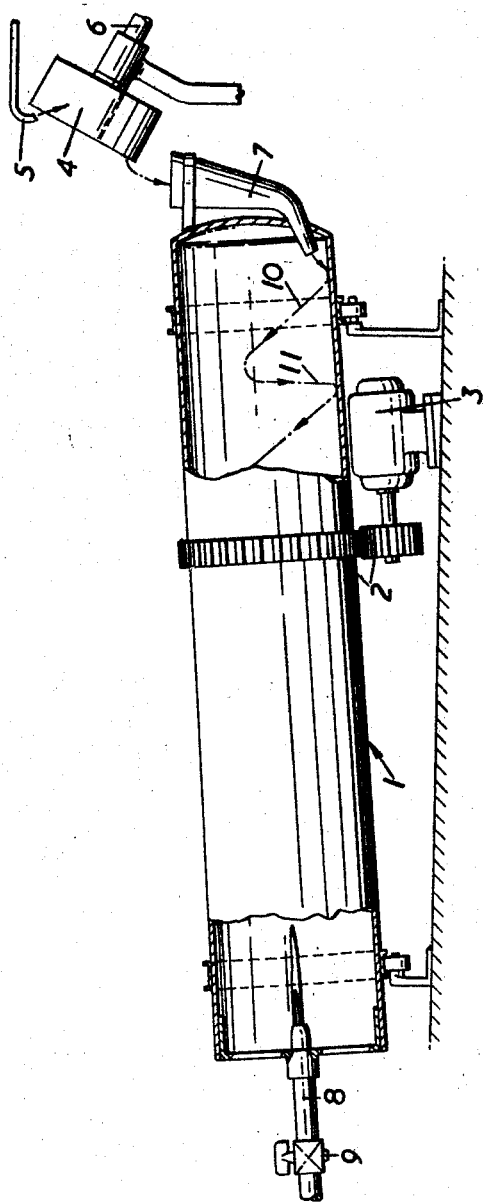
Inventors
Horace Cole
James Peter Procter
By
Morrison, Kennedy, Campbell
Attorneys ＃ 3,082,102
PROCESSES OF MANUFACTURING GLASS
Horace Cole, Helens, and James P. Procter, Manchester, England, assignors to Pilkington Brothers Limited, Liverpool, England, a corporation of Great Britain
Filed Sept. 3, 1958, Ser. No. 758,817
Claims priority, application Great Britain Sept. 10, 1957
10 Claims. (Cl. 106—52)

This invention relates to silicate glass manufacture.

In a customary method of making glass, a silicate glass batch (which is in granular form) is fed to a tank furnace to form molten glass, the molten glass is flowed therefrom in ribbon form and cooled. The batch from which the molten glass is formed usually comprises silica (about 70%), calcium carbonate, sodium carbonate, sodium sulphate, the sodium sulphate being present to combine with the residual silica during the melting process.

In feeding the furnace, heaps of batch are successively dumped into previously formed molten glass at the charging end of the furnace. The heaps so dumped float partly submerged in the molten glass; accordingly the batch material is exposed to widely different melting temperatures.

The part of each heap (about one third) above the level of the molten glass is exposed on all sides to the high temperature of the heating gases, and a liquid phase in the form of a thin layer of melted batch flows down each heap to the molten glass; on the other hand the submerged part (about two thirds) of each heap is more slowly melted since it is exposed to a much lower temperature, which may be several hundred degrees centigrade lower, being shielded from the burning gases and subjected only to the temperature of the body of molten glass.

The flow of melted material on the heaps involves the formation of low silica glass which glass separates from still undissolved silica and undissolved silica flows on to the surface of the tank.

To obtain greater uniformity in the heat treatment of glass batch fed to a glass melting furnace, the batch is sometimes fed to the furnace in the form of relatively thin compacted layers on to the molten glass in the furnace, the layers being successively deposited in contiguity on the molten glass in the layer form, each layer of batch fed to the molten glass extending substantially across the width thereof.

Thus, in both these well known methods of melting batch, the batch is heated up to the melting temperature (1500° C.) in the furnace and is held at such elevated temperature until melting is completed. In practice, the batch is at such temperature for a considerable time (about 36 hours) before melting is completed because the rate determining step in the final production of homogeneous glass is the dissolution of free silica into the already formed low silica glass. This is a slow process.

A main object of the present invention is to provide an improved process of converting the batch into molten glass with considerable economy in the expenditure of heat.

A process of producing molten glass from a glass batch according to the present invention is characterized by the step of maintaining the glass batch at a temperature and for a period of time sufficient to complete chemical reaction between the component particles while the batch as a whole remains in the solid state at the completion of the reaction, before subjecting the embryo glass so formed to a temperature high enough to melt the embryo glass.

Examples of the types of reactions in question are indicated by the following equations:

$$Na_2CO_3 + SiO_2 = Na_2O.SiO_2 + CO_2$$
$$2Na_2CO_3 + SiO_2 = 2Na_2O.SiO_2 + 2CO_2$$

From another aspect the invention comprises a process of producing molten glass from a glass batch characterised in that the batch is first subjected to a thermal treatment at a temperature and for a period of time which is sufficient to complete chemical reaction between the component particles of the batch while the latter as a whole remains solid and subsequently subjecting the embryo glass so formed to a temperature high enough to melt the embryo glass.

In referring to the state of the batch as a whole remaining at the completion of the reaction as being in a solid state we mean either that no liquid phase has been produced at any time during reaction or, of a low melting point component is present, that any liquid phase is momentary only as it is immediately combined with the solid components. An example of a commonly employed component having a low melting point and momentary existence as a liquid in the presence of other components of glass batch is that substance known as boric acid.

Thus the reaction between the particles of the batch is completed while they are still in the solid state and without the formation of a liquid phase and practically speaking no silica is left in the treated batch.

The present invention also comprises a process of producing molten glass from a batch consisting of silica, calcium carbonate and sodium carbonate and little or no sodium sulphate by maintaining the batch at a temperature and for a period of time sufficient to complete chemical reaction between the components while the batch as a whole remains in the solid state at the completion of the reaction and subsequently subjecting the embryo glass to a temperature high enough to melt the embryo glass.

Experiments have shown that by subjecting a soda-lime-silica glass batch to a temperature of about 800° C.–810° C. but not more than 820° C., for a length of time depending on the particle size of the silica grain, the mass can be entirely converted into a homogeneous body of embryo glass, that is to say, that the body thus formed has only to be subjected to a melting temperature for that body for a very short time to convert the reacted body into molten glass.

For normal size sand grains (all passing through 20-mesh sieves i.e. 20 meshes to the inch) approximately 50% reaction has taken place in one hour but where said grains all pass through 150 mesh the reactions are substantially complete in this time.

The experiments have shown that a soda-lime-silica batch of 20 mesh particle size (the usual particle size of sand used in glass making) takes 4 hours at 800° C. for the completion of the reactions. It will therefore be observed that the reaction time varies with the fineness of the particles, and it will be appreciated that the melting point of the sodium carbonate governs the reaction temperature.

In the case of borosilicate glass batch suitable for employment in the manufacture of glass filaments, for example a batch having the composition, silica 53–67%, calcium oxide 16–30%, magnesium oxide 1–7%, aluminum oxide 7–17%, boric oxide 8–9%, the reaction may be effected at a temperature of up to 900° C.

From the foregoing it will be observed that the reaction effected according to the invention is effected below the sintering temperature of any of the reaction products formed in the thermal treatment, thus as no liquid phase of the batch is created the production of a sticky mass in the embryo glass is entirely avoided.

The present invention comprehends the method of making an embryo glass, comprising maintaining the batch at a temperature and for a period of time sufficient to cause reaction between the batch ingredients while the batch as a whole remains in the solid state at the completion of the reaction, as well as the embryo glass produced as a new article of manufacture which is immediately convertible by heat treatment into molten glass.

Because of the condition in which the pre-reaction is effected, it may conveniently be carried out in a slowly rotating rotary tunnel rotating at about 40 r.p.m., which tunnel may be of cylindrical or polygonal cross section, and inclined at an angle of about 5° to the horizontal. The batch material is fed into the upper end of the tunnel, and is fed by gravity along the tunnel, as hereinafter explained, as the latter rotates. The burning gases which effect the heat treatment are projected into the lower end.

When carrying out the reaction in a rotary tunnel it is preferred to nodulate the glass batch, for example to sizes of ¼"–½" diameter.

The nodulating step is effected for convenience in handling the fine powdery material of which the batch consists and to minimise adhesion to the walls of the tunnel, moreover dust formation at the feeding end of the kiln is avoided and of course dust losses up the flue of the tunnel are minimised. Further a higher output is obtained from the tunnel, as compared with feeding the granular batch thereto, because of increase of bulk density; and from another aspect a greater weight of batch is acted on in the tunnel in a given unit of time than would occur if the granular batch was fed in.

Another advantage of nodulation is the decrease of loss of volatile ingredients in the batch as opposed to physical carry-over by gas streams.

The nodules may be conveniently prepared by continuously feeding batch into nodulating apparatus of known form and consisting of a drum which revolves on an axis inclined to the vertical and subjecting the batch to a spray of water as the drum is rotated. The amount of water applied to the batch to form the nodules depends upon the nature of the batch but is usually 12–15% by weight of the batch.

In this aspect, therefore, the present invention provides a process of producing embryo glass comprising converting particulate batch material into nodules in each of which the batch material is bound together by means of water, feeding the nodules into the upper end of a downwardly inclined rotating tunnel kiln, the tunnel rotating at a low angular velocity and set at a small angle to the horizontal so that the nodules travel through the tunnel by being alternately carried upwardly by the wall of the tunnel as it rotates and then allowed to tumble down to the floor area of the tunnel but at a point further down the tunnel than that at which they started their upward journey, and heating the space within the tunnel so that during the passage of the nodules through the tunnel they are maintained at a temperature and for a period of time sufficient to complete reaction between the component particles while the batch as a whole remains solid.

In order that the invention may be more clearly understood a preferred embodiment thereof will now be described by way of example with reference to the accompanying diagrammatic drawing which is a side elevation view, partly exploded of a rotating tunnel kiln, and associated nodulating drum.

Referring to the drawing an elongated cylindrical tunnel kiln indicated generally at 1 is inclined at an angle of about 5° to the horizontal and is driven by means of reduction gearing 2 associated with a motor 3. Glass batch is nodulated in a drum 4, equipped with a water pipe 5 and rotated with shaft 6 driven by a motor not shown from which the nodules fall into hopper 7 and are then fed from the hopper into the upper end of the kiln whilst combustion gas is fed into the lower end of the kiln from pipe 8 in quantities controlled by valve 9 and burnt in order to maintain the interior of the kiln at the desired temperature.

The kiln is rotated at such a rate that the nodules travel down through the kiln by successively being carried up the side wall of the kiln in a diagonal direction as indicated at 10, and then tumbling down onto the floor area of the kiln, as indicated at 11, at a point further down the kiln than that from which they started, that is, they travel in a zig-zag form of path.

The employment of separate nodules of batch, in conjunction with the tumbling effect, thus ensures that the whole surface of the batch is exposed to the heat in the kiln and so maintained at the desired temperature. The residence time of the nodules may be controlled by altering the length of the kiln and/or its inclination.

After the pre-reaction is completed the embryo glass so formed may be fed to a glass melting furnace where only the extra heat of melting and fining to required from the furnace to produce the molten glass, hence great heat economy is achieved by effecting the two-stage treatment of reacting and then melting in the production of molten glass as a continuous process.

By feeding the embryo glass material produced according to the present invention to a furnace for melting glass dissolution of silica into an already made glass is entirely avoided and in consequence efficient heat utilisation is obtained i.e. for a given amount of heat a greater (twice the normal) quantity of molten glass can be produced or the same quantity may be produced at a much lower temperature i.e. 100° C. less than normal melting temperature, with a resultant increase of useful life of the furnace. In the absence of any production of low silica glass homogeneity is achieved with the absence of seed and bubble as all gases in the batch material were driven off in producing the embryo glass.

However, it will be appreciated that there is economy in the consumption of heat even if the product obtained from the pre-reaction stages is allowed to cool before being fed to a glass melting furnace, as the chemical reaction required between the components to form glass has already been carried out. As a result the embryo glass has only to be brought to the melting temperature for the glass to directly convert the solid reacted components into a molten condition and then to the working temperature in the glass melting furnace.

Experiments have shown that a very considerable saving in fuel required for producing molten glass can be obtained and that, under optimum conditions, about ten times the amount of batch can be converted into molten glass for a given quantity of fuel when operating in accordance with the invention than has hitherto been produced in the ordinary tank furnace, in which the granular batch is floated on molten glass.

As homogeneity is established in the embryo glass, the subsequent treatment in a glass melting equipment is purely physical, causing the embryo glass to be converted to a molten workable state.

A process as herein described forms a relatively easy means of melting those batches of material which in ordinary processes are difficult to melt, in particular "hard" boro silicate batches and low-alkali glasses.

By employing a batch which does not include sodium sulphate (salt cake) the refractories of the melting tank of a glass melting furnace are not exposed to the chemical attack engendered by the presence of this usual component of batch used in making glass, which attack is the more serious at the higher temperatures of melting in the furnace.

Owing to the rapid rate of melting embryo glass produced according to the invention a relatively small glass melting tank only is required to give the necessary surface area for a required output of glass. Further owing to the rapid rate of melting of embryo glass made according to the invention only a relatively small melting area is sufficient for a required output of refined molten glass.

We claim:
1. In the production of molten glass from a silicate glass batch of the group consisting of soda-lime-silica glass batches and borosilicate glass batches, said glass batch providing a proportion of silica which is relatively large with respect to any other ingredient, the step of substantially completing the chemical reactions between the component particles by maintaining the glass batch at a temperature of not over approximately 900° C. and below the sintering temperature of any of the reaction products for a period of time sufficient to substantially complete said chemical reactions between the component particles while the batch as a whole remains in the solid state at the completion of the reaction and before subjecting the embryo glass so formed to a temperature high enough to melt the embryo glass.

2. A process of producing molten glass from a silicate glass batch of the group consisting of soda-lime-silica glass batches and borosilicate glass batches, said glass batch providing a proportion of silica which is relatively large with respect to any other ingredient characterised in that the chemical reactions between the component particles are substantially completed by subjecting the component particles to a thermal treatment at a temperature of not over approximately 900° C. and below the sintering temperature of any of the reaction products for a period of time which is sufficient to substantially complete chemical reactions between the component particles of the batch while the latter as a whole remains in the solid state at the completion of the reaction, and subsequently subjecting the embryo glass to a temperature high enough to melt the embryo glass.

3. A process of producing embryo glass comprising converting a silicate glass batch material into nodules in each of which the particulate batch material is bound together by means of water, feeding the nodules into the upper end of a downwardly inclined rotating tunnel kiln, the tunnel rotating at a low angular velocity and set at a small angle to the horizontal so that the nodules travel through the tunnel by being alternately carried upwardly by the wall of the tunnel as it rotates and then allowed to tumble down to the floor area of the tunnel but at a point further down the tunnel than that at which they started their upward journey, and heating the space within the tunnel so that during the passage of the nodules through the tunnel they are maintained at a temperature below the sintering temperature of any of the reaction products and for a period of time sufficient to complete chemical reaction between the component particles while the nodules as a whole remain in a solid but unsintered state at the completion of the reaction, the heating of the nodules being below the sintering temperature thereof.

4. A process of producing molten glass from a silicate glass batch consisting essentially of a major proportion of silica, minor proportions of calcium carbonate and sodium carbonate and optionally sodium sulphate, by maintaining the batch at a temperature not exceeding 820° C. and below the sintering temperature of any of the reaction products for a period of time sufficient to complete chemical reaction between the component particles while the batch remains in the solid state at the completion of the reaction to form embryo glass, and subsequently subjecting the embryo glass to a temperature high enough to melt the embryo glass, the proportions of said ingredients being such that, at the completion of the reactions, the batch is substantially free from uncombined silica.

5. A process of producing in a molten state soda lime silica glass from a silicate glass batch consisting essentially of a major proportion of silica and minor proportions of calcium carbonate and sodium carbonate, characterised in that the chemical reactions between the component particles of the particulate batch are substantially fully completed at a temperature of about 800° C. to 810° C. for a period of time depending on the particle size of the silica grains, while the batch remains solid, and subsequently subjecting the embryo glass formed to a temperature high enough to melt the embryo glass, the proportions of the said ingredients being such that at the completion of the said reactions the batch is substantially free from uncombined silica.

6. A process of converting a particulate soda lime silica glass batch consisting essentially of a major proportion of silica and minor proportions of calcium carbonate and sodium carbonate into embryo glass, characterised by substantially fully completing the chemical reaction between the component particles while the batch remains solid, by a treatment carried out at a temperature of about 800° C. to 810° C., but not exceeding 820° C., for a period of time dependent on the particle size of the silica grains, the proportions of the ingredients of the batch being such that at the completion of said reactions the batch is substantially free from uncombined silica.

7. A process of producing an embryo borosilicate glass from a borosilicate glass batch consisting essentially of a predominating proportion of silica and lesser proportions of calcium oxide, aluminum oxide and boric oxide, the embryo glass being convertible to molten glass by subjecting the embryo glass to a temperature high enough to melt the embryo glass, the process comprising maintaining the borosilicate glass batch at a temperature not exceeding 900° C. and below the sintering temperature of any of the reaction products, for a period of time sufficient to complete chemical reaction between the component particles while the batch remains in the solid state at the completion of the reaction, the proportions of the said ingredients being such that at the completion of the reaction the batch is substantially free from uncombined silica.

8. As a new article of manufacture, embryo silicate glass prepared by the process of claim 7 and consisting of fully reacted batch material devoid of a liquid phase, which embryo material is directly convertible by heat treatment into a molten glass.

9. A process of producing an embryo borosilicate glass from a borosilicate glass batch comprising 53% to 67% silica, 16% to 30% calcium oxide, 1% to 7% magnesium oxide, 7% to 17% aluminum oxide and 8% to 9% boric oxide, which latter is convertible to molten glass by subjecting the embryo glass to a temperature high enough to melt the embryo glass, the process comprising maintaining the borosilicate glass batch at a temperature not exceeding 900° C. and below the sintering temperature of any of the reaction products for a period of time sufficient to complete chemical reaction between the component particles while the batch remains in the solid state at the completion of the reaction, and the reacted batch forming the embryo glass being substantially free of uncombined silica.

10. As a new article of manufacture, embryo silicate glass prepared by the process of claim 6 and consisting of fully reacted batch material devoid of a liquid phase, which embryo material is directly convertible by heat treatment into a molten glass.

References Cited in the file of this patent
UNITED STATES PATENTS

| | | |
|---|---|---|
| 1,394,973 | Crossley | Oct. 25, 1921 |
| 1,543,770 | Hilbert | June 30, 1925 |
| 2,260,749 | Kelsey | Oct. 28, 1941 |
| 2,265,540 | Nichols | Dec. 9, 1941 |
| 2,886,461 | Taylor et al. | May 12, 1959 |